US010582027B2

(12) United States Patent
Bhandari et al.

(10) Patent No.: US 10,582,027 B2
(45) Date of Patent: Mar. 3, 2020

(54) IN-BAND METADATA EXPORT AND REMOVAL AT INTERMEDIATE NODES

(71) Applicant: Cisco Technology, Inc., San Jose, CA (US)

(72) Inventors: Shwetha Subray Bhandari, Bangalore (IN); Frank Brockners, Köln (DE); Akshaya Nadahalli, Bangalore (IN); Carlos M. Pignataro, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/844,741

(22) Filed: Dec. 18, 2017

(65) Prior Publication Data

US 2019/0141168 A1    May 9, 2019

(30) Foreign Application Priority Data

Nov. 4, 2017    (IN) .............................. 201741039352

(51) Int. Cl.
*H04L 12/26* (2006.01)
*H04L 12/24* (2006.01)
*H04L 12/855* (2013.01)
*H04L 29/06* (2006.01)
*H04L 29/08* (2006.01)
(Continued)

(52) U.S. Cl.
CPC .......... *H04L 69/22* (2013.01); *H04L 43/026* (2013.01); *H04L 43/028* (2013.01); *H04L 43/04* (2013.01); *H04L 45/74* (2013.01); *H04L 47/36* (2013.01); *H04L 67/2804* (2013.01)

(58) Field of Classification Search
CPC ..... H04L 47/36; H04L 67/2804; H04L 69/22; H04L 2012/5625
See application file for complete search history.

(56) References Cited

U.S. PATENT DOCUMENTS

2008/0144836 A1    6/2008  Sanders et al.
2009/0037713 A1    2/2009  Khalid et al.
(Continued)

FOREIGN PATENT DOCUMENTS

| WO | 9962221 A1 | 12/1999 |
| WO | 2011/051750 A2 | 5/2011 |
| WO | 2012/085898 A2 | 6/2012 |

OTHER PUBLICATIONS

Frank Brockners, "Verify my service chain!", Cisco blog, Architects & Distinguished Engineers Discussions, XP-002761776, Jun. 3, 2015, 4 pgs.
(Continued)

*Primary Examiner* — Scott M Sciacca
(74) *Attorney, Agent, or Firm* — Edell, Shapiro & Finnan, LLC

(57) ABSTRACT

A method provided that is performed at one or more intermediate nodes in a path in a network. The node receives a packet having a header that includes metadata that has been accumulated as the packet travels along the path in the network. The node detects whether a trigger condition has occurred. In response to detecting that the trigger condition has occurred, the node exports, to a destination entity, at least a portion of the metadata that has been accumulated in the header so that the portion of the metadata is removed from the header after it has been exported.

20 Claims, 9 Drawing Sheets

(51) Int. Cl.
*H04L 12/741* (2013.01)
*H04L 12/805* (2013.01)

(56) References Cited

U.S. PATENT DOCUMENTS

| | | | |
|---|---|---|---|
| 2012/0221854 | A1 | 8/2012 | Orsini et al. |
| 2013/0326049 | A1* | 12/2013 | Talton .................... H04L 43/04 709/224 |
| 2014/0198791 | A1 | 7/2014 | Lim |
| 2014/0362682 | A1 | 12/2014 | Guichard et al. |
| 2015/0063102 | A1 | 3/2015 | Mestery et al. |
| 2015/0092564 | A1 | 4/2015 | Aldrin |
| 2015/0131484 | A1 | 5/2015 | Aldrin |
| 2015/0195197 | A1 | 7/2015 | Yong et al. |
| 2015/0227411 | A1 | 8/2015 | Yi et al. |
| 2015/0227930 | A1 | 8/2015 | Quigley et al. |
| 2015/0319490 | A1 | 11/2015 | Besehanic |
| 2016/0315850 | A1 | 10/2016 | Dare et al. |
| 2018/0279113 | A1* | 9/2018 | Yerrabommanahalli .................... H04W 8/02 |
| 2018/0331890 | A1* | 11/2018 | Song ................. H04L 41/08 |

OTHER PUBLICATIONS

Frank Brockners, "What if you had a trip-recorder for all your traffic at line rate performance?", Cisco blog, Architects & Distinguished Engineers Discussions, XP-002761777, May 19, 2015, 3 pgs.

F. Brockners, et al., "Service Chain Verification", DevNet-1084, Ciscolive!, Berlin, Germany, Feb. 15-19, 2016, XP009191657, 59 pgs.

Morris Dworkin, "Recommendations for Block Cipher Modes of Operation", Methods and Techniques, NIST Special Publication 800-38A, 2001 Edition, Dec. 2001, 66 pgs.

"Shamir's Secret Sharing", Wikipedia, https://en.wikipedia.org/wiki/Shamir's_Secret_Sharing, downloaded from the Internet on Oct. 1, 2015, 4 pgs.

S. Deering, et al., Request for Comments 2460, "Internet Protocol, Version 6 (IPv6)", Specification, Internet Working Group, Dec. 1998, 39 pgs.

S. Previdi, Ed. et al., "IPv6 Segment Routing Header (SRH) draft-previdi-6man-segment-routing-header-07" Internet Draft, Network Working Group, Jul. 20, 2015, 33 pgs.

F. Brockners, et al., "Data Fields for In-situ OAM", draft-brockners-inband-aom-data-04, ippm, Internet-Draft, Mar. 29, 2017, 25 pgs.

F. Brockners, et al., "Data Fields for In-situ OAM", draft-brockners-inband-aom-data-07, ippm, Internet-Draft, Jul. 2, 2017, 29 pgs.

International Search Report and Written Opinion in counterpart International Application No. PCT/US2018/058080, dated Feb. 11, 2019, 12 pages.

F. Brockners, et al., "Data Fields for In-situ OAM", draft-ietf-ippm-ioam-data-01, ippm, Internet-Draft, Oct. 30, 2017, 29 pages.

H. Song, Ed., et al., "On Scalability of In-situ OAM", draft-song-ippm-ioam-scalability-01, ippm, Internet-Draft, Jun. 27, 2017, 12 pages.

* cited by examiner

IN-BAND METADATA EXPORT AND REMOVAL AT INTERMEDIATE NODES

PRIORITY CLAIM

This application claims priority to Indian Provisional Application No. 201741039352, filed Nov. 4, 2017, the entirety of which is incorporated herein by reference.

TECHNICAL FIELD

The present disclosure relates to network path tracing.

BACKGROUND

Path tracing solutions record the path within the live customer traffic. Examples of such solutions include In-band/In-situ Operations, Administration, and Maintenance (IOAM) or In-Network Telemetry (INT). These solutions use space in a packet which is directly proportional to the number of hops the packet travels. Examples of data stored within the packet include an identifier, timestamp, interfaces visited, queue depth etc., for each node the packet traverses.

For large networks with a large amount of nodes and/or long paths, this approach can result in a large amount of metadata that is required to be carried in the packet. The schemes which insert unique metadata on a per-hop basis suffer from implementation challenges. They either require changes to the size of the packet at every hop (which gives rise to Path Maximum Transmission Unit (PMTU) issues) or they require write operations into the packet at varying locations within the packet. In other words, a pointer is read from the packet and then data is dropped into the location the pointer indicates. This is not easy to implement in hardware.

DESCRIPTION OF EXAMPLE EMBODIMENTS

Overview

Figure 1:
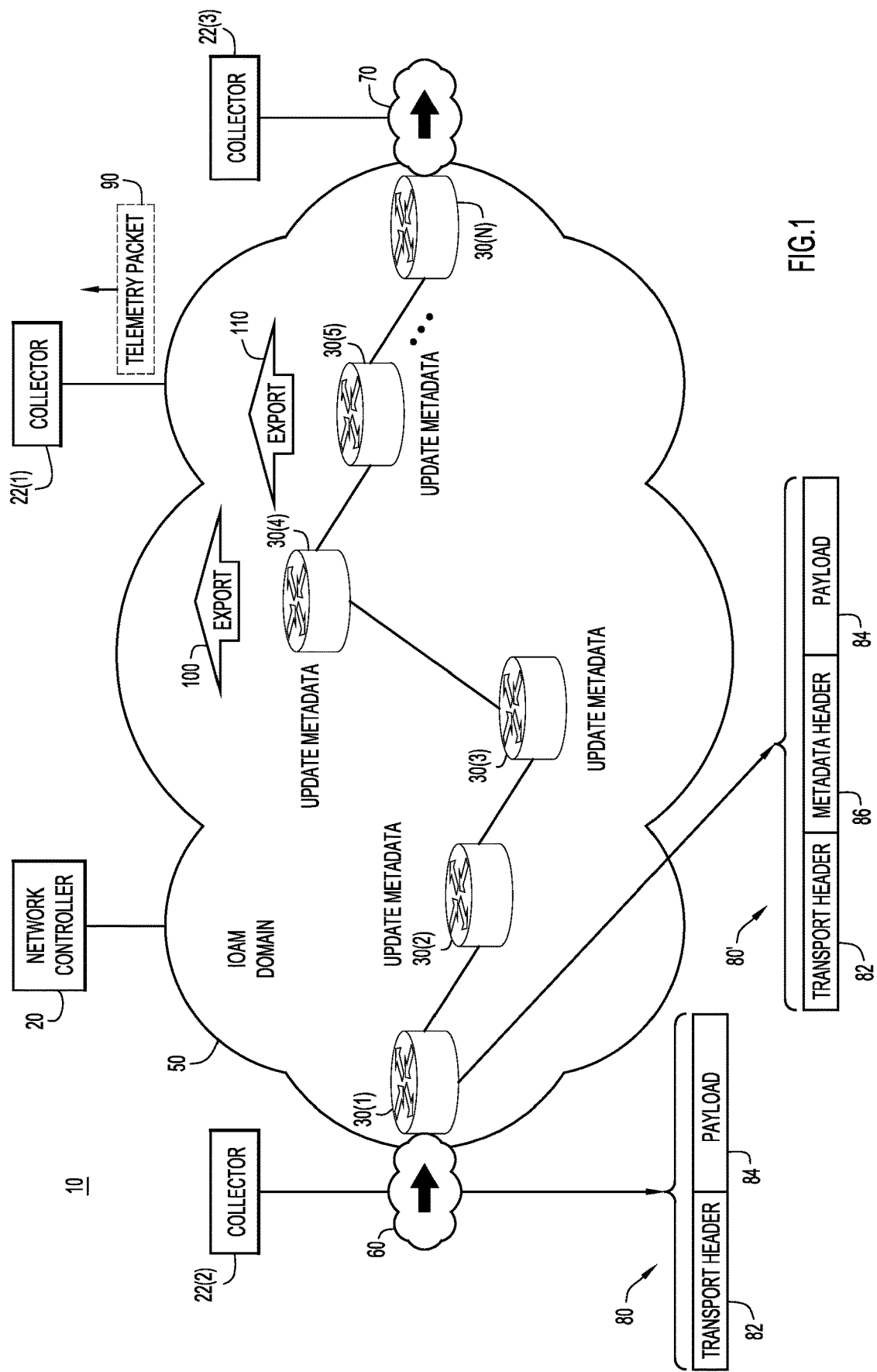
FIG. 1 is a block diagram of a system configured to enable in-band metadata export and removal at intermediate nodes in a network, according to an example embodiment.

In accordance with one embodiment, a method is provided that is performed at one or more intermediate nodes in a path in a network. The node receives a packet having a header that includes metadata that has been accumulated as the packet travels along the path in the network. The node detects whether a trigger condition has occurred. In response to detecting that the trigger condition has occurred, the node exports, to a destination entity, at least a portion of the metadata that has been accumulated in the header so that the portion of the metadata is removed from the header after it has been exported.

Example Embodiments

Path tracing solutions record the path within the live traffic. One example of a packet tracing solution is, In-band/In-situ Operations, Administration, and Maintenance (IOAM), and another example is In-Network Telemetry (INT). Both of these solutions use space in a packet which is directly proportional to the number of hops the packet travels. Examples of metadata included within the packet are an identifier, timestamp, interfaces visited, queue depth etc., for each node the packet traverses.

For operational reasons these solutions need a mechanism to limit the amount of data that gets recorded into the packet. It is desirable that packet size stays within path's maximum transport unit (PMTU) limits to prevent packet drop due to IOAM metadata. In addition, data plane/hardware implementations have limits on how deep they can "see" into the packet for inspection. For example, Equal Cost Multipath (ECMP) hashing is performed with Layer 4 (L4) information and many hardware Application Specific Integrated Circuits (ASICs) support only a certain lookup depth. Further still, there are data plane/ASIC constraints on writing data at varying locations within a packet.

In the general case, the solution presented herein addresses the challenge where IOAM metadata for M hops need to be gathered, but the space in the packet is only of size N, with M>N. This solution address several problems. First, to enforce maximum IOAM data size, data recording stops when maximum data size is reached. As a result, only partial path information tracing is visible in networks with a large diameter. Second, some IOAM Data (e.g., Proof-of-Transit) needs to necessarily be processed by service nodes, while other IOAM Data (e.g., Trace and Performance) is mostly used by a central station/controller. Proof-of-Transit data is data written by a node into a metadata of a packet to verify that the packet passed through a given node/entity in the network along the path that the packet traverses. There may be several such "check point" nodes in a given path. Third, when there are packet drops, in transit IOAM data is lost (since IOAM data is carried within the packet). However, that iOAM Data is useful to troubleshoot and debug the cause of the packet drop.

The IETF draft https://tools.ietf.org/html/draft-brockners-inband-oam-data-04#section-4.1 details a packet format for tracing used in IOAM path trace recording. There are 2 ways to record the path tracing information. The first is to pre-allocate the metadata container in the packet. Each node updates its data at the current offset from the header and updates the offset that will be used by the next node in path. There is a field called "Octets-left" that indicates how much space remains in the metadata container for path trace data. The second is to incrementally grow the packet up to a maximum size. Each node adds its trace data following IOAM trace header up to a maximum size as indicated in the header. There is a field called "Maximum Length" that specifies the maximum size the packet can reach from path trace data. When the "Octets-left" field is zero or "Maximum Length" is reached, the path trace recording stops. Consequently, in both the pre-allocated and incremental methods, only partial data is recorded, or the packet can grow unnaturally in size.

According to the embodiments presented herein, when IOAM data is added and the size remaining to be included is not sufficient, then the node exports the data and resets the collected trace-elements to make room for more data. In this way, the space in the header can be limited and it is still possible to obtain sufficiently correlated information. This will also assist in determining the location/path subset where the packet is dropped, if it is dropped.

Referring first to FIG. 1, a diagram is shown of a system 10 according to an example embodiment. The system includes a network controller (management entity) 20, a collector 22(1) and a plurality of network nodes (simply called "nodes") 30(1)-30(N) that reside in a network 40. The nodes 30(1)-30(N) of network 40 may be part of a particular IOAM domain 50, and there may be other IOAM domains 60 and 70, etc., which are under control of the network controller 20 or under control of a separate/different network controller. For simplicity, only a single network controller 20 is shown in FIG. 1. However, FIG. 1 shows that there may be a dedicated collector entity for each of the other IOAM domains 60 and 70, where collector 22(2) is for domain 60 and collector 22(3) is for domain 70.

Node 30(1) is an ingress node to domain 50 and node 30(N) is an egress node. The nodes 30(1), 30(2), 30(3), 30(4) and 30(5) are examples of intermediate or transit nodes for the example network shown in FIG. 1.

A packet 80 is received by ingress node 30(1). At this point, the packet may consist of a transport header 82 and payload 84. The transport header 82 may be, for example, an Internet Protocol version 6 (IPv6) header, but other transport header types are possible. The payload 84 may be any type of data carried by the packet 80. Before node 30(1) forwards the packet on to the next hop, e.g., node 30(2), node 30(1) adds a metadata header 86, as well as metadata into the metadata header 86, to form packet 80'. Examples of the metadata header 86 and the metadata are described further below, but in general, the metadata header 86 is populated with path related information. As packet 80' is received by each of the other nodes, e.g., nodes 30(2), 30(3), 30(4), 30(5), and so on, each node updates the metadata in the header 86, by adding more metadata to the metadata header. According to the techniques presented herein, rather than waiting until the packet reaches the egress node 30(N) to obtain access to the accumulated metadata in metadata header 86, one or more of the intermediate/transit nodes in the path of the packet may export at least a portion of the accumulated metadata in metadata header 86, to a desired destination, such as to the collector 22. This is shown at reference numerals 100 and 110 in FIG. 1, from nodes 30(4) and 30(5). The collector 22(1) may be a network analysis entity or application that can store and analyze the received exported data, or make the stored exported data available to another entity for analysis. In some embodiments, the functions of the collector 22(1) may be integrated with the functions of the network controller 20.

In one example, the metadata header 86 is an IOAM header and the metadata is IOAM metadata. Moreover, examples of metadata included in header 86 include an identifier, timestamp, interfaces visited, queue depth etc., for each node the packet traverses. Other examples of metadata include: time spent at each node, node state including central processor unit (CPU) usage, Input/Output (I/O) usage, memory usage, geographic location of the node, etc.

As a packet with IOAM metadata traverses from one IOAM domain to another IOAM domain, the mechanisms presented herein allow for removing the IOAM metadata, sending the IOAM metadata to a collector dedicated for a given domain, e.g., collector 22(1) for domain 50, and the packet without metadata but with IOAM empty containers is sent through to the next domain, e.g., domain 70, to collect the new metadata for the new domain, that is ultimately sent to a collector that only manages that new domain, e.g., collector 22(3) for domain 70.

Mechanisms are presented herein to enable export of IOAM data at any hop, including transit nodes, e.g., nodes 30(2), 30(3), 30(4) and 30(5) in the example of FIG. 1. A transit node can be configured to export IOAM data and optionally remove (parts of) IOAM data from the packet, depending on local decision making. A node includes the exported IOAM data in a telemetry packet or message, as shown at reference numeral 90. The local decisions could be: (1) lack of space available in the packet or in the metadata header; or (2) administrative reasons, such as administrative boundaries in the IOAM domain such that it is desirable that not all nodes have full visibility to the IOAM data; or (3) other triggers, such as semantics of each type of metadata.

Furthermore, there may be situations where only a portion of the IOAM data would be removed (i.e. keep Proof-of-Transit data and End-to-End data, but remove (parts of) trace data).

Figure 2:
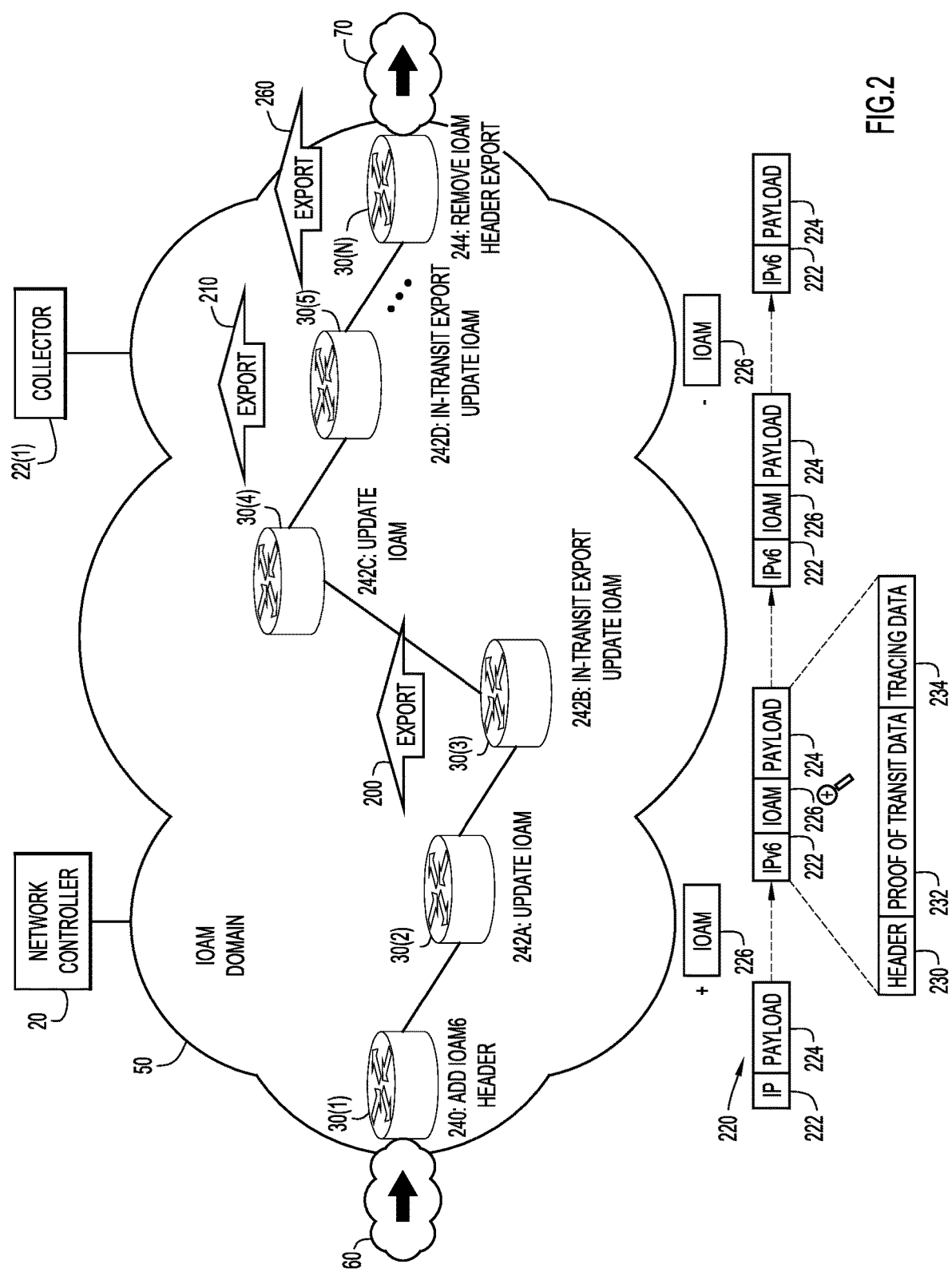
FIG. 2 is a diagram similar to FIG. 1, and illustrating metadata export when insufficient space in a metadata header occurs, in accordance with an example embodiment.

Reference is now made to FIG. 2. FIG. 2 is similar to FIG. 1, and illustrates a first example use case for the aforementioned techniques. FIG. 2 illustrates a solution to the problem of lack of visibility when the path length exceeds the data space available in the packet or the metadata header of the packet for recording path related information. The solution is to have intermediate/transit nodes export at least some of the accumulated metadata collected along the packet's path, and reset the accumulation of path trace metadata to allow for further collection and accumulation of new path trace metadata in the metadata header. This is shown in FIG. 2, for example, at reference numerals 200 and 210 for intermediate/transit nodes 30(3) and 30(5), respectively.

Based on some policy configured on a given node, when there is no more space, the node exports all of the metadata that has been accumulated, and overwrites existing data with new data. More specifically, in the example of FIG. 2, node 30(1) receives a packet 220 that includes an IPv6 header 222 and payload 224. At step 240, node 30(1) adds an IOAM header 226 (and adds IOAM metadata into header 226) and the resulting packet is sent to node 30(2). The IOAM header 226 includes a header field 230, Proof-of-Transit data 232 and Tracing Data 234, for example.

Next, node 30(2) receives the resulting packet from node 30(1) and at 242A, updates the IOAM header with IOAM metadata, and sends the packet on in the network. Node 30(3) receives the resulting packet from node 30(2). Node 30(3) determines that there is insufficient space available in the packet (or in the IOAM header 226) to add more IOAM metadata. As a result, at 242B, node 30(3) copies all of the IOAM metadata contained in the IOAM header 226 for export in a telemetry packet (not shown) to a desired destination, e.g., collector 22(1), as shown at 200. In so doing, node 30(3) will reset path tracing from node 30(3) onward. Path tracing is reset by node 30(3) and node 30(3) updates the IOAM header 226 by overwriting the contents of the IOAM metadata header 226 with new data appropriate for node 30(3). Node 30(3) forwards the resulting packet on in the network.

Node 30(4) receives the packet from node 30(3). At 242C, node 30(4) determines that there is sufficient space in the packet (e.g., in the metadata header 226) to add more data, so it updates the IOAM header 226 with metadata appropriate for node 30(4), and forwards the packet on in the network.

Node 30(5) receives the packet from node 30(4). Like node 30(3), at 242D, node 30(5) determines that there is insufficient space available in the packet (or in the IOAM header 226) to add more IOAM metadata. As a result, at 242D, node 30(5) copies all of the IOAM metadata contained in the IOAM header 226 for export in a telemetry packet (not shown) to a desired destination, e.g. collector 22(1), as shown at 210. In so doing, node 30(5) will reset path tracing from node 30(5) onward. Path tracing is reset by node 30(5) and node 30(5) updates the IOAM header 226 by overwriting the contents of the IOAM metadata header 226 with new data appropriate for node 30(5). Node 30(5) forwards the resulting packet on in the network.

Eventually, the packet reaches node 30(N), the egress node. At 244, node 30(N), being an egress node, will remove the IOAM header from the packet, and at 260, export the accumulated IOAM data in the IOAM header to a desired destination, e.g., collector 22(1).

In the foregoing example, when nodes 30(3) and 30(5) perform the in-transit export, the nodes may export all the accumulated data, but overwrite with new data only what is needed to be overwritten, and not necessarily all of the accumulated data.

Using the techniques described above in connection with FIG. 2, the entity that receives the exported data, e.g., the collector 22(1), will receive all of the relevant data (Proof-of-Transit data and tracing data) for a path, but in pieces, each exported separately. For example, node 30(3) will export accumulated IOAM metadata that accounts for the portion of the path from node 30(1) to node 30(2), node 30(5) may will export accumulated IOAM metadata for the portion of the path from node 30(3) to node 30(4), and node 30(N) will accumulate the IOAM metadata for the remaining portion of the path from node 30(5) to node 30(N). The entity that receives the exported metadata, e.g., collector 22(1), can then piece together the entire view of the path of the packet from the multiple separately exported records.

Figure 3:
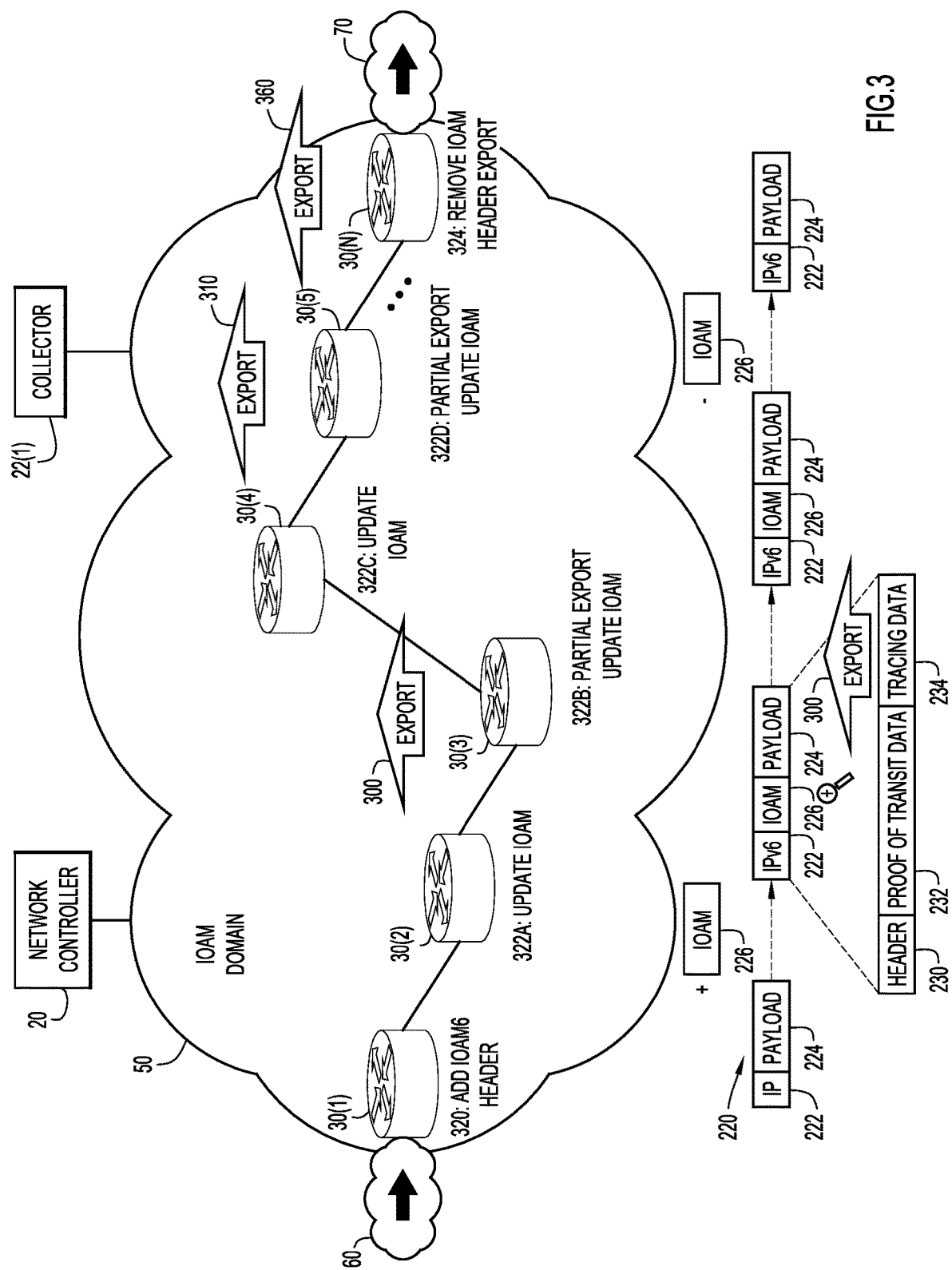
FIG. 3 is a diagram similar to FIG. 1, and illustrating selective and partial metadata export, in accordance with an example embodiment.

Reference is now made to FIG. 3. FIG. 3 shows an example use case for in-transit selective and partial export of IOAM metadata (e.g., leaving Proof-of-Transit data 232 in the metadata header, but export tracing data 234). In this example, nodes 30(3) and 30(5) again are exporting accumulated metadata at 300 and 310, but not all of the accumulated metadata. The packet flow depicted at steps 320, 322A-322D and 324 is similar to the packet flow 240, 242A-242D and 244 shown in FIG. 2, with the exception that the export 322B from node 30(3) and the export at node 322D from node 30(5) is an export in a telemetry packet (not shown) of, for example, only the tracing data 234, as shown at 330. The accumulated Proof-of-Transit data 232 will remain in the header 226. When doing a partial export, the node needs to reset only that part of the IOAM data that was exported, e.g., the accumulated tracing data 234. The last hop node 30(N) also exports any accumulated metadata to the collector 22(1) as shown at reference numeral 360.

Figure 4:
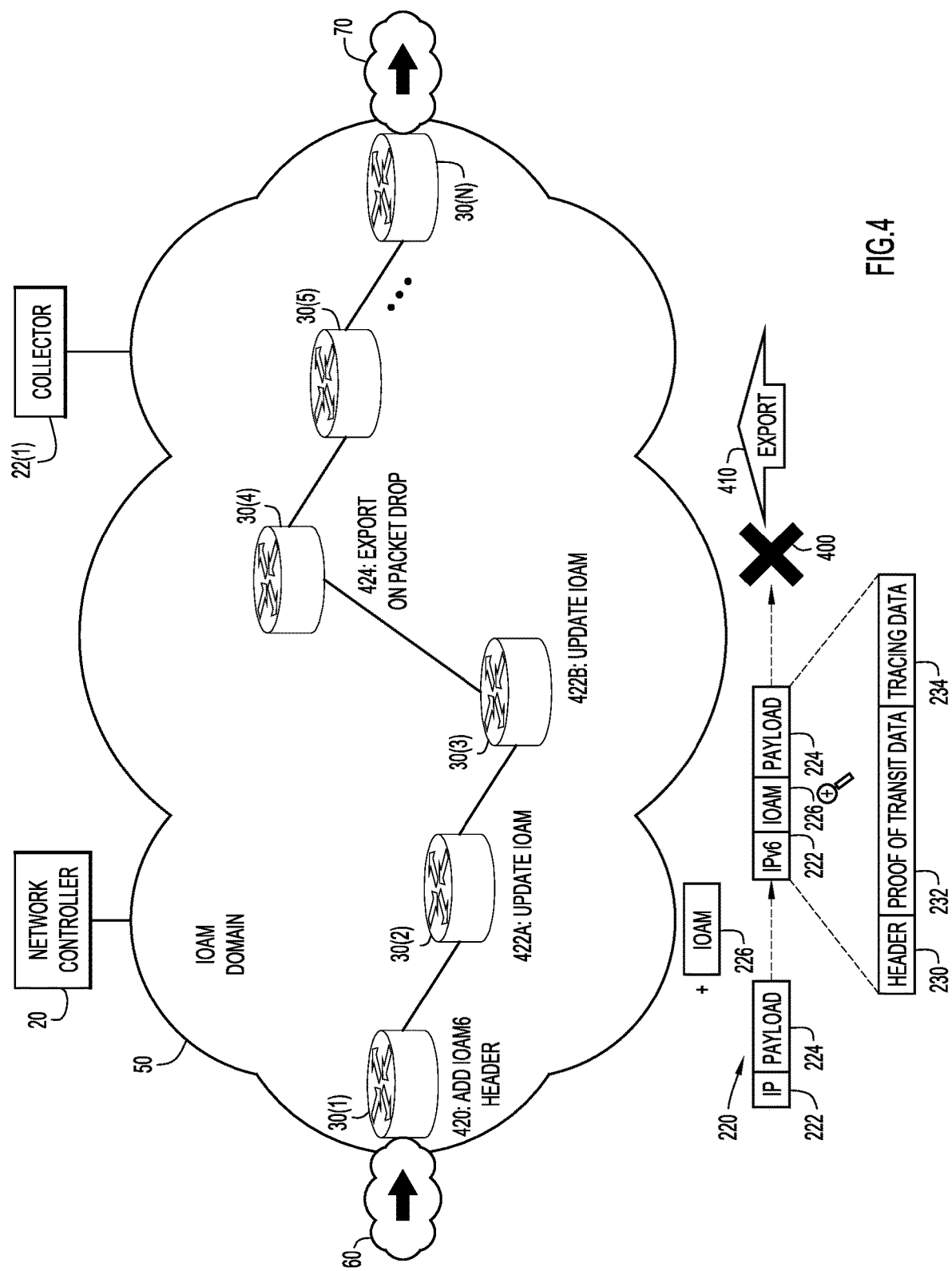
FIG. 4 is a diagram similar to FIG. 1, and illustrating metadata export when a packet drop occurs, in accordance with an example embodiment.

Reference is now made to FIG. 4. FIG. 4 shows an example embodiment where the condition to trigger an export is not related to available space in the IOAM header. Rather, to help in fault isolation when packets are dropped, multiple intermediate nodes in the network can be configured/instructed to export IOAM data. The destination entity, e.g., the collector 22(1), can correlate IOAM data from multiple export points for isolating packet drops. In the example scenario depicted in FIG. 4, a packet drop has occurred somewhere in the path near node 30(3) and 30(4) as indicated at reference numeral 400, and node 30(4) exports accumulated IOAM metadata as shown at reference numeral 410.

The packet flow in the example is as follows. At 420, node 30(1) adds an IOAM header 226 to packet 220 and adds data appropriate for node 30(1) into the IOAM header 226. Node 30(1) sends the resulting packet to node 30(2). Node 30(2) receives the packet from node 30(1), and at 422A, node 30(2) updates the IOAM header with data appropriate for node 30(2) and sends the packet to node 30(3). Node 30(3) receives the packet from node 30(2) and at 422B updates the IOAM header with data appropriate for node 30(3). However, the packet is dropped/lost somewhere between node 30(3) and node 30(4). As an example, node 30(4) is configured to export at least a portion of the metadata in a telemetry packet (not shown) to the collector 22(1).

There are several ways that an export can be triggled from one or more nodes when a packet drop occurs. In accordance with one technique, the network controller 20 may send to the one or more nodes that are in the neighborhood of the packet drop an out-of-band command that configures those one or more nodes to export IOAM metadata to the controller 20. Those one or more nodes will begin exporting IOAM metadata to the controller until the controller 20 commands them to stop exporting IOAM metadata. In accordance with another technique, the network controller 20 may send to a node in the path, e.g., node 30(1), a command that causes that node to include a flag in the IOAM header 226 to trigger one or more nodes after that node, to export part or all of their accumulated IOAM metadata. The nodes that receive a packet having that flag set in the IOAM header will recognize the presence of this flag and respond by exporting accumulated metadata to a destination, e.g. to the network controller 20. The advantage of this latter technique is that the exporting will be selective as well as temporary—triggered by packets that include that flag set in the IOAM header.

In FIGS. 1-4, the operation of exporting generally involves three steps: (1) copying at least a portion of metadata in the packet forwarding path of the metadata header, to a telemetry packet or message; (2) removing the portion of the metadata from the header and resetting the metadata fields to make it reusable to store new metadata; and (3) sending the collected data included in the telemetry packet/message to a collection point or destination entity, e.g., the network collector 22(1).

In any of the foregoing embodiments, when doing a trace data reset, a reset is also made of information in the header indicating whether the packet is full to some initial (non-full) condition. For example, the aforementioned "Octets- Left" field may be reset to indicate that there is space available in the IOAM metadata header.

Figure 5:
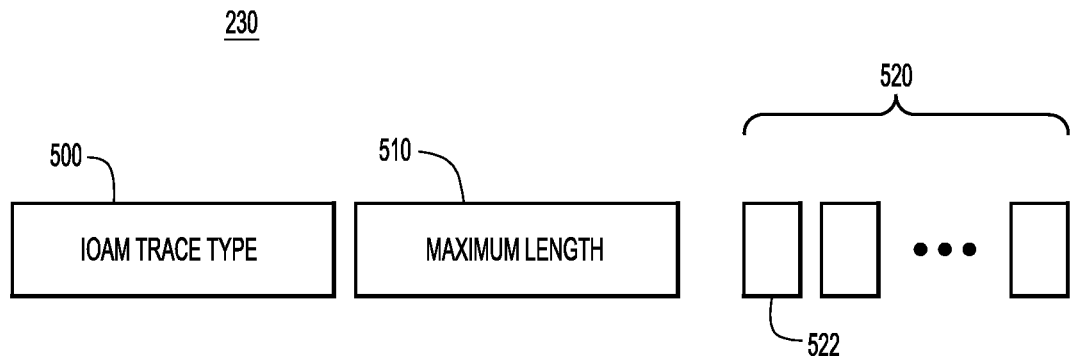
FIG. 5 is a diagram illustrating a header field of a metadata header, in accordance with an example embodiment.

Reference is now made to FIG. 5. FIG. 5 shows an example of the header 230 of the IOAM header 226, referred to above in FIGS. 2-4. In one form, the header 230 includes an IOAM trace type field 500, a maximum length field 510 and one or more flags 520. One of the flags 520, such as one-bit flag 522, may be allocated to trigger the selective export of IOAM metadata for the packet drop embodiment described above in connection with FIG. 4. The flag 522, when set to "1" may indicate to a node that it is to export its IOAM metadata, and when set to "0", it indicates to the node that it is not to export its IOAM metadata.

Still referring to FIG. 5, the maximum length field 510 may also be used for purposes of the embodiments presented herein. Recall from above description of FIGS. 1 and 2, that the maximum length is used by a node to determine when the metadata header of the packet is full. Consequently, a control entity, such as the network controller 20 referred to in FIGS. 1-4, may set a value of the maximum length field 510 in the header 230, in order to cause a node, at some point along the path, to export its accumulated metadata. If it is desired to have IOAM data exported at a certain node-hop interval along a path in the network, then the value of this field is set to a value which will cause that export to occur at a desired node-hop interval between edge nodes (ingress and egress nodes). For example, if a network has a diameter of 8 nodes, and each nodes adds 10 bytes of metadata to the IOAM header, and it is desired that IOAM data be exported at every $3^{rd}$ node, then the maximum length field 510 is set equal to the amount of data that 3 nodes would have accumulated, or 30 bytes (instead of 80 bytes, for example). This will cause every $3^{rd}$ node to export its accumulated metadata. Thus, by setting an appropriate value for the maximum length field 510, a network controller 20 can control the interval of nodes in the network that export IOAM data to create multiple export points along the path, which can be useful for isolating faults.

Figure 6:
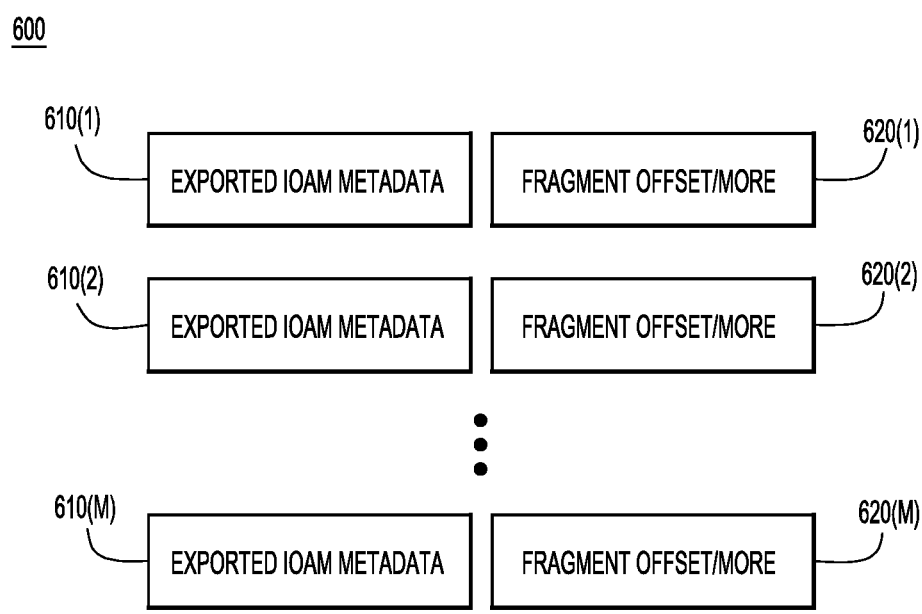
FIG. 6 is a diagram illustrating data management of exported metadata, in accordance with an example embodiment.

In FIGS. 1-4, when a node exports metadata to a destination, e.g., the controller 22(1), the metadata from multiple nodes may overlap due to the nature of the accumulated data. The destination that receives the exported data may use a fragment offset/more fragment notation scheme to identify/distinguish the exported data from a given node with respect to exported data (which may overlap) from other nodes in the path of the packet. This is shown in FIG. 6, where for each received exported IOAM metadata 610(1)-610(M), there is a fragment offset/more fragment field 620(1)-620(M) used to re-assemble the received exported data from nodes. For example, the Time To Live (TTL) field of the packet, that decreases by one at each hop a packet traverses, when included with the exported data, can serve to order the exported data from multiple nodes in the network.

Figure 7:
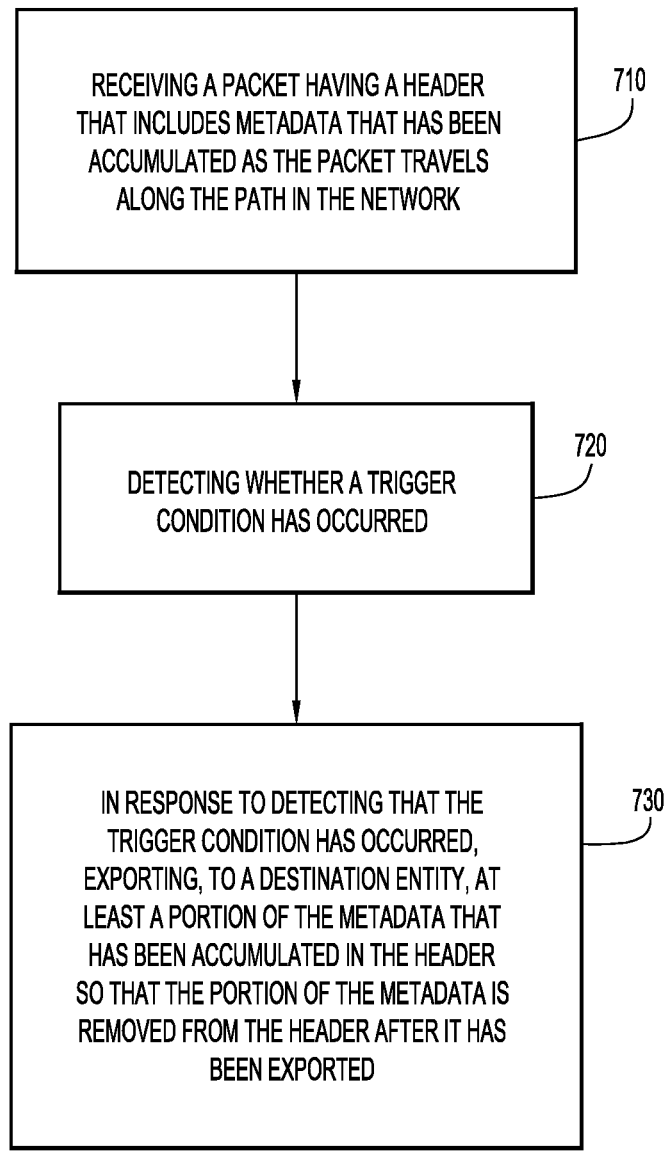
FIG. 7 is a flow chart depicting operations performed by an intermediate/transit node, in accordance with an example embodiment.

Reference is now made to FIG. 7. FIG. 7 illustrates a flow chart of a method 700 performed at one or more intermediate/transit nodes in a path in a network, in accordance with the embodiments presented herein. The flow chart shown in FIG. 7 is meant to be generic to all of the embodiments described herein. At 710, a packet is received, the packet having a header that includes metadata that has been accumulated as the packet travels along the path in the network. At 720, the node detects whether a trigger condition has occurred. At 730, in response to detection that the trigger condition occurred, the node exports to a destination entity (e.g., collector 22(1) referred to in connection with FIGS. 1-4), at least a portion of the metadata that has been accumulated in the header so that the portion of the metadata is removed from the header after it has been exported. More specifically, as described above, the exporting operation 730 includes: copying the portion of the metadata into a telemetry packet, removing the portion of the metadata from the header; and sending the telemetry packet to the destination entity.

As described above, the trigger condition can take on a variety of forms. The trigger condition may be a determination by the node that there is no space available in the packet for additional metadata. In this case, the trigger condition may be based on: (a) the node determining that a length of the header will exceed a maximum length specified by a value in a maximum length field associated with the header; (b) the node detecting an indicator in field of the header that there is no space available in the header for additional metadata; or (c) a maximum size of the packet has been reached.

In still another form, the trigger condition is a determination by the node that the portion of the metadata included in the packet should not be visible to one or more nodes residing in a different administrative domain, e.g., a different IOAM domain, as described above in connection with FIG. 1.

In yet another form, the trigger condition is based on a type of metadata. One example for this condition is when trace data is present and the packet is leaving the domain. The type of trace data collected may restrict its exposure to entities outside the domain. The presence of node identifiers (IDs) in the trace can expose internal topology of the network and hence can serve as one of the reasons to strip (remove) and export the data.

In still another form, the trigger condition is a determination by the node that a length of the header will exceed a maximum length specified by a value in a maximum length field associated with the header, wherein the value in the maximum length field is set so as to cause nodes at a hop interval along the path to export at least the portion of the metadata. An entity, such as network controller 20, may set the value of the maximum length field, and command an ingress node (e.g., node 30(1)) in FIGS. 1-4, to use this value when adding the IOAM header to a packet.

In yet another variation, the trigger condition is presence of a predetermined instruction indicator in the header, such as a flag in a header field of IOAM header, as shown in FIG. 5. The instruction indicator may be set by, or under control of, a network controller entity, e.g., network controller 20. The network controller entity may command a node in the network, such as an ingress node, to include the instruction indicator in the header when a packet drop has occurred in order to isolate the packet drop in the network.

The method 700 may further include resetting the portion of the header for which metadata has been exported, and updating the portion of the header with new metadata by overwriting the at least part of the header.

As explained above in connection with FIGS. 2-4, the metadata may include path tracing data and Proof-of-Transit data. Moreover, as described in connection with FIG. 3, the exporting may include exporting the path tracing data but not the Proof-of-Transit data.

After exporting the portion of the metadata from the header, the portion of the header for which the metadata has been exported is reset, and therefore, the node can update the portion of the header with new metadata by overwriting the portion of the header. As explained above, the header may be an IOAM header.

Figure 8:
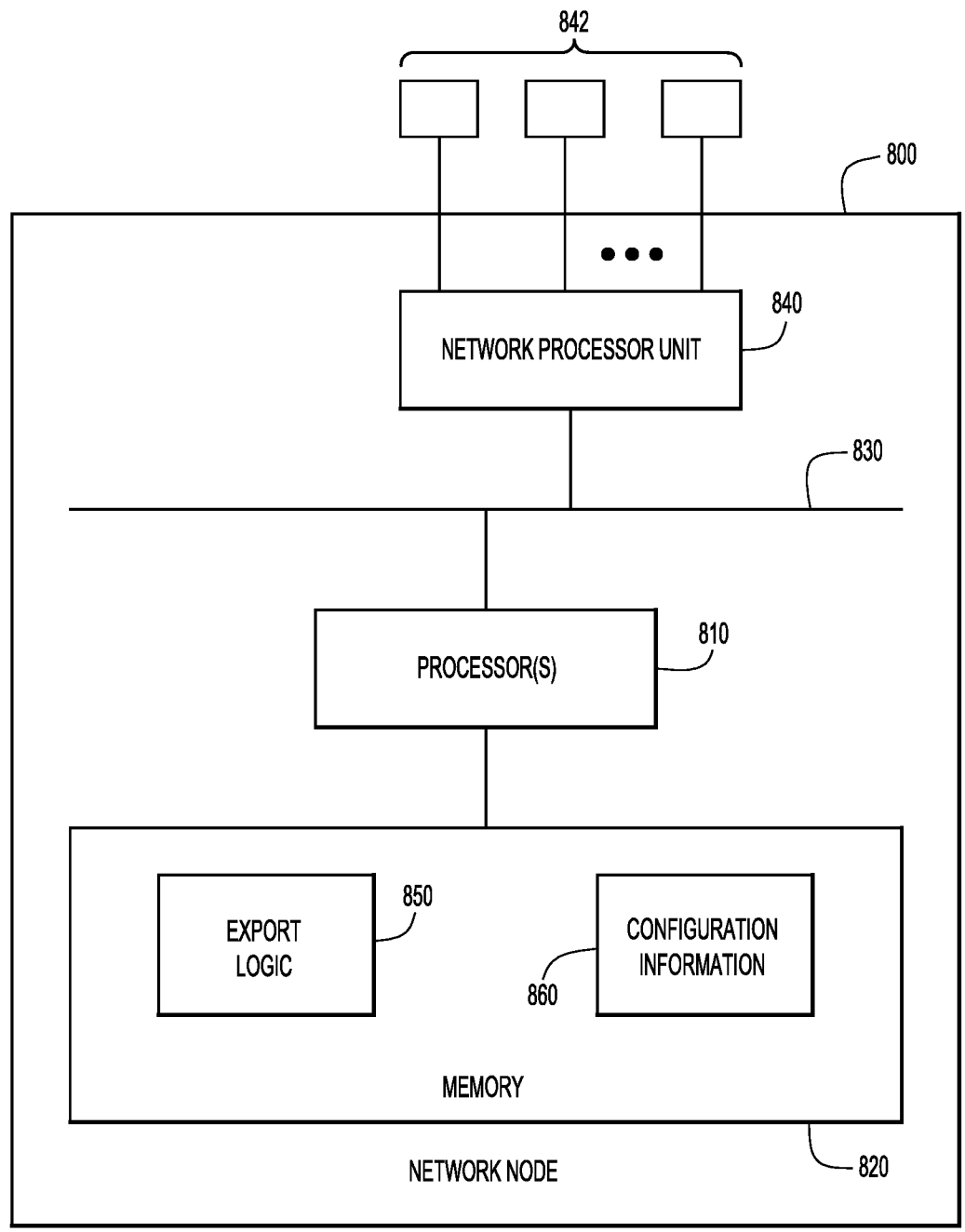
FIG. 8 is a block diagram of a network node configured to perform metadata export, in accordance with an example embodiment.

Reference is now made to FIG. 8. FIG. 8 illustrates a block diagram of a network node 800 configured to perform the operations described herein, e.g., any of the network nodes 30(2), 30(3), 30(4) and 30(5) shown in FIGS. 1-4. The network node 800 includes one or more processors 810, memory 820, a bus 830 and a network processor unit 840. The processor 810 may be a microprocessor or microcontroller. The network processor unit 840 may include one or more Application Specific Integrated Circuits (ASICs) and facilitates network communications between the network device 800 and other network nodes as well as the network controller 20. There are a plurality of network ports 842 at which the node 800 receives packets and from which the node 800 sends packets into the network. The processor 810 executes instructions associated with software stored in memory 820. Specifically, the memory 820 stores instructions for export logic 850 that, when executed by the processor 810, causes the processor 810 to perform the export operations described herein. The memory 820 also stores configuration information 860 received from a network controller to configure the network node according to desired network functions. It should be noted that in some embodiments, the export logic 850 may be implemented in the form of firmware that is processed by ASICs as part of the network processor unit 840.

The memory 820 may include read only memory (ROM) of any type now known or hereinafter developed, random access memory (RAM) of any type now known or hereinafter developed, magnetic disk storage media devices, tamper-proof storage, optical storage media devices, flash memory devices, electrical, optical, or other physical/tangible memory storage devices. In general, the memory 820 may comprise one or more tangible (non-transitory) computer readable storage media (e.g., a memory device) encoded with software comprising computer executable instructions and when the software is executed (by the processor 810) it is operable to perform the network node operations described herein.

Figure 9:
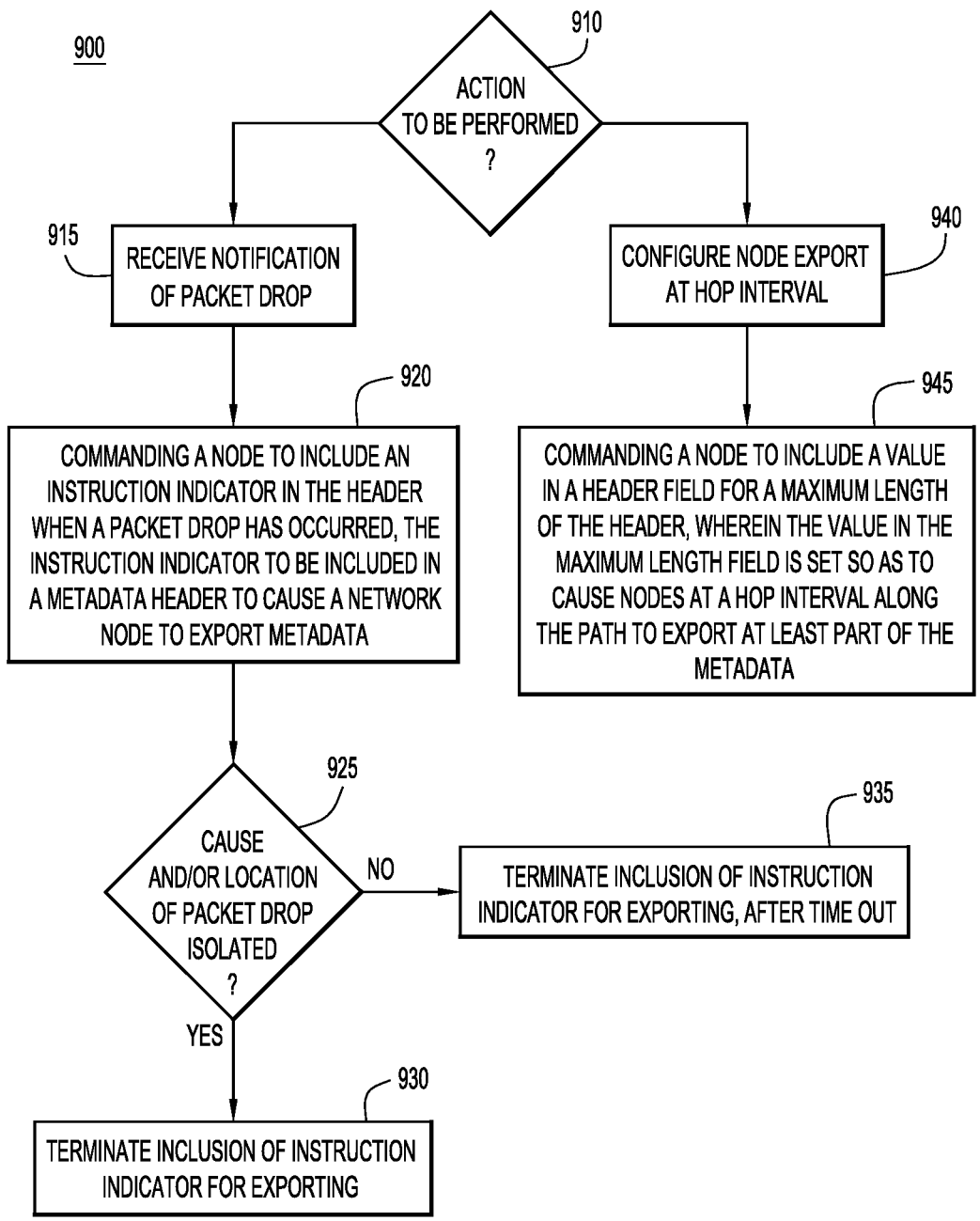
FIG. 9 is a flow chart depicting operations performed by a network controller, in accordance with an example embodiment.

Reference is now made to FIG. 9. FIG. 9 shows a flow chart of a method 900 performed by a network controller, e.g. network controller 20, in accordance with an example embodiment. The method 900 depicts some, but not necessarily all, operations that may be performed by a network controller. At 910, the network controller determines an action to be performed. For example, at 915, the network controller may receive notification of, or otherwise learn, of a packet drop in a network under its control. If so, then at 920, the network controller may command a node, such as an ingress node, or a node just prior to where the packet drop is suspected of occurring in the network, to include an instruction indicator (e.g., a flag) in the header when a packet drop has occurred, the instruction indicator to be included in a metadata header which will cause a network node to export metadata upon detecting presence of the instruction indicator. As a result, all nodes that are capable of recognizing the instruction indicator and exporting metadata will do so. The network controller may permit this export to continue until the cause and/or location of the packet drop is isolated, as indicator at 925. Once the cause and/or location is isolated, then at 930, the network controller will terminate inclusion of the instruction indicator for exporting metadata. Or, even if the cause and/or location is not isolated, the network controller may terminate inclusion of the indicator after some time-out period, as indicated at 935. This is because it is generally not desirable to have nodes exporting metadata for an indefinite period of time.

As an example of another action, the network controller 20 may configure node export at some regular/predetermined hop interval, as indicated at 940. At 945, the network controller commands a node, e.g., an ingress node, to include a value in a header field for a maximum length of the header, wherein the value in the maximum length field is set so as to cause nodes at a regular/predetermined hop interval along the path to export at least part of the metadata. It is to be understood that the operations 940 and 945 may also be performed when a packet drop situation occurs, but those operations have utility for other scenarios as well.

Figure 10:
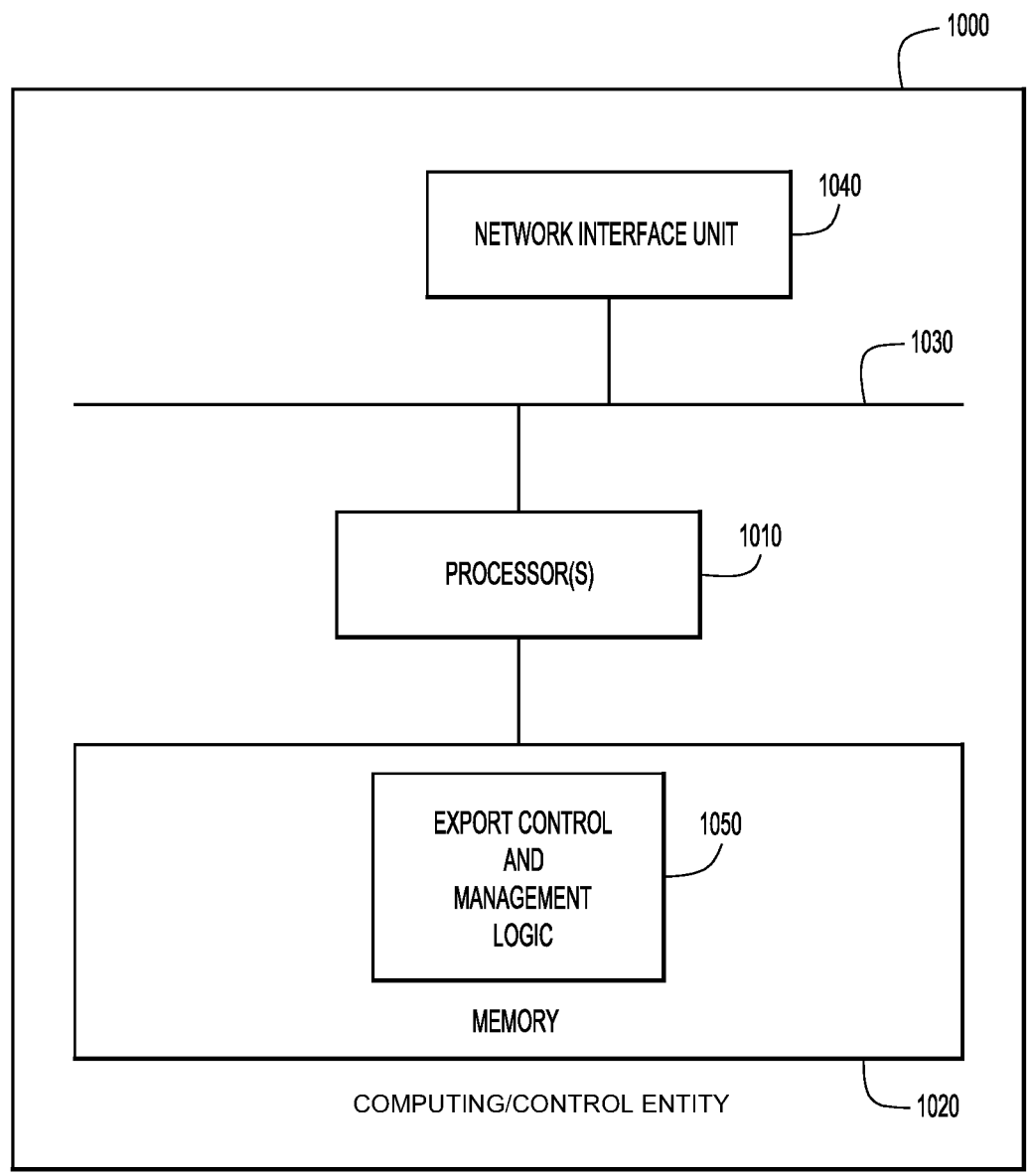
FIG. 10 is a block diagram of a network controller configured to participate in the metadata export mechanisms presented herein, in accordance with an example embodiment.

Reference is now made to FIG. 10. FIG. 10 illustrates a block diagram of a computing/control entity 1000 that may perform the functions of the network controller 20 described herein. The computing/control entity 1000 includes one or more processors 1010, memory 1020, a bus 1030 and a network interface unit 1040, such as one or more network interface cards that enable network connectivity. The memory 1020 stores instructions for export control and management logic 1050, that when executed by the processor 1010, cause the processor to perform the network controller operations described herein.

The memory 1010 may include ROM of any type now known or hereinafter developed, RAM of any type now known or hereinafter developed, magnetic disk storage media devices, tamper-proof storage, optical storage media devices, flash memory devices, electrical, optical, or other physical/tangible memory storage devices. In general, the memory 1020 may comprise one or more tangible (non-transitory) computer readable storage media (e.g., a memory device) encoded with software comprising computer executable instructions and when the software is executed (by the processor 1010) it is operable to perform the network controller operations described herein.

To summarize, presented herein are mechanisms/techniques for the export and removal of trace metadata from multiple intermediate nodes, based on a variety of triggers. Trace data reset on export to allow new trace data recording. This allows for intermediate export of packet metadata, of which IOAM data is an example. There are several methods for intermediate-node export of metadata, based on various triggers such as: packet size, metadata (IOAM data) size, configuration threshold for packet/IOAM data length, type of metadata, or instruction in the IOAM data, local configuration or policy.

Thus, in one form, a method is providing comprising: at one or more intermediate nodes in a path in a network: receiving a packet having a header that includes metadata that has been accumulated as the packet travels along the path in the network; detecting whether a trigger condition has occurred; and in response to detecting that the trigger condition has occurred, exporting, to a destination entity, at least a portion of the metadata that has been accumulated in the header so that the portion of the metadata is removed from the header after it has been exported.

In another form, an apparatus is provided comprising: a plurality of ports at which packets may be received from a network and from which network packets may be sent into the network; and a processor configured to: receive a packet having a header that includes metadata that has been accumulated as the packet travels along the path in the network; detect whether a trigger condition has occurred; and in response to detecting that the trigger condition has occurred, export, to a destination entity, at least a portion of the metadata that has been accumulated in the header so that the portion of the metadata is removed from the header after it has been exported.

In still another form, one or more non-transitory computer readable storage media encoded with instructions that, when executed by a processor of a node, cause the processor to:

receive a packet having a header that includes metadata that has been accumulated as the packet travels along the path in a network; detect whether a trigger condition has occurred; and in response to detecting that the trigger condition has occurred, export, to a destination entity, at least a portion of the metadata that has been accumulated in the header so that the portion of the metadata is removed from the header after it has been exported.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   at an intermediate node among intermediate nodes in a path in a network:
   receiving a packet having a header that includes metadata that has been accumulated as the packet travels along the path in the network;
   determining whether there is no space available in the packet for additional metadata;
   determining whether the header includes a flag set to a value to trigger the intermediate node to export part or all of the metadata that has been accumulated as the packet travels along the path;
   detecting whether a trigger condition has occurred as a result of either there being no space available in the packet or the flag being set to the value;
   in response to detecting that the trigger condition has occurred, exporting, to a destination entity, at least a portion of the metadata that has been accumulated in the header so that the portion of the metadata is removed from the header after it has been exported, wherein the portion of the metadata that is exported comprises an indicator field to be used to order the portion of the metadata with one or more other portions of metadata; and
   responsive to a command sent from a network controller entity, setting the flag to the value to cause one or more of the intermediate nodes in the path after the intermediate node to export part or all of the metadata that has been accumulated.

2. The method of claim 1, wherein exporting includes:
   copying the portion of the metadata into a telemetry packet;
   removing the portion of the metadata from the header; and
   sending the telemetry packet to the destination entity.

3. The method of claim 1, wherein the trigger condition is a determination by the intermediate node that there is no space available in the packet for additional metadata.

4. The method of claim 3, wherein the trigger condition is based on (a) the intermediate node determining that a length of the header will exceed a maximum length specified by a value in a maximum length field associated with the header; (b) the intermediate node detecting an indicator in field of the header that there is no space available in the header for the additional metadata; or (c) a maximum size of the packet has been reached.

5. The method of claim 1, wherein the trigger condition is a determination by the intermediate node that the portion of the metadata should not be visible to one or more of the intermediate nodes residing in a different administrative domain.

6. The method of claim 1, wherein the trigger condition is based on a type of metadata.

7. The method of claim 1, wherein the trigger condition is a determination by the intermediate node that a length of the header will exceed a maximum length specified by a value in a maximum length field associated with the header, wherein the value in the maximum length field is set so as to cause intermediate nodes at a hop interval along the path to export at least the portion of the metadata.

8. The method of claim 1, wherein the trigger condition is presence of a predetermined instruction indicator in the header.

9. The method of claim 8, wherein the predetermined instruction indicator is set by the network controller entity.

10. The method of claim 9, further comprising the network controller entity commanding the intermediate node to include the predetermined instruction indicator in the header when a packet drop has occurred.

11. The method of claim 1, further comprising:
    resetting the portion of the header for which metadata has been exported; and
    updating the portion of the header with new metadata by overwriting the portion of the header.

12. The method of claim 1, wherein the metadata includes path trace data and proof of transit data, and wherein exporting comprises exporting the path trace data but not the proof of transit data.

13. The method of claim 1, wherein the header is an In-situ Operations, Administration, and Maintenance (IOAM) header.

14. An apparatus comprising:
    a plurality of ports at which packets may be received from a network and from which network packets may be sent into the network; and
    a processor configured to:
    receive a packet having a header that includes metadata that has been accumulated as the packet travels along a path in the network;
    determine whether there is no space available in the packet for additional metadata;
    determine whether the header includes a flag set to a value to trigger export of part or all of the metadata that has been accumulated as the packet travels along the path;
    detect whether a trigger condition has occurred as a result of either there being no space available in the packet or the flag being set to the value;
    in response to detecting that the trigger condition has occurred, export, to a destination entity, at least a portion of the metadata that has been accumulated in the header so that the portion of the metadata is removed from the header after it has been exported, wherein the portion of the metadata that is exported comprises an indicator field to be used to order the portion of the metadata with one or more other portions of metadata; and
    responsive to a command sent from a network controller entity, set the flag to the value to cause export, by nodes along the path, of part or all of the metadata that has been accumulated as the packet travels along the path.

15. The apparatus of claim 14, wherein the processor is configured to export by:
    copying the portion of the metadata into a telemetry packet;
    removing the portion of the metadata from the header; and
    sending the telemetry packet to the destination entity.

16. The apparatus of claim 14, wherein the trigger condition is a determination by the apparatus that there is no space available in the packet for the additional metadata.

17. The apparatus of claim 14, wherein the trigger condition is a determination by the processor that a length of the header will exceed a maximum length specified by a value in a maximum length field associated with the header, wherein the value in the maximum length field is set so as to cause nodes at a hop interval along the path to export at least the portion of the metadata.

18. The apparatus of claim 14, wherein the trigger condition is presence of a predetermined instruction indicator in the header.

19. One or more non-transitory computer readable storage media encoded with instructions that, when executed by a processor of a node, cause the processor to:
 receive a packet having a header that includes metadata that has been accumulated as the packet travels along a path in a network;
 determine whether there is no space available in the packet for additional metadata;
 determine whether the header includes a flag set to a value to trigger export of part or all of the metadata that has been accumulated as the packet travels along the path;
 detect whether a trigger condition has occurred as a result of either there being no space available in the packet or the flag being set to the value;
 in response to detecting that the trigger condition has occurred, export, to a destination entity, at least a portion of the metadata that has been accumulated in the header so that the portion of the metadata is removed from the header after it has been exported, wherein the portion of the metadata that is exported comprises an indicator field to be used to order the portion of the metadata with one or more other portions of metadata; and
 responsive to a command sent from a network controller entity, set the flag to the value to cause export, by nodes along the path, of part or all of the metadata that has been accumulated as the packet travels along the path.

20. The non-transitory computer readable storage media of claim 19, wherein the instructions that cause the processor to export include instructions that cause the processor to:
 copying the portion of the metadata into a telemetry packet;
 removing the portion of the metadata from the header; and
 sending the telemetry packet to the destination entity.

* * * * *